US010807054B2

(12) United States Patent
De Malsche et al.

(10) Patent No.: US 10,807,054 B2
(45) Date of Patent: Oct. 20, 2020

(54) MIXING OF FLUIDS

(71) Applicant: VRIJE UNIVERSITEIT BRUSSEL, Brussels (BE)

(72) Inventors: Wim De Malsche, Berchem (BE); Tobias Vandermeersch, Hallaar (BE)

(73) Assignee: VRUE UNIVERSITEIT BRUSSEL, Brussels (BE)

( * ) Notice: Subject to any disclaimer, the term of this patent is extended or adjusted under 35 U.S.C. 154(b) by 164 days.

(21) Appl. No.: 15/319,824

(22) PCT Filed: Jun. 22, 2015

(86) PCT No.: PCT/EP2015/064005
§ 371 (c)(1),
(2) Date: Dec. 19, 2016

(87) PCT Pub. No.: WO2015/193511
PCT Pub. Date: Dec. 23, 2015

(65) Prior Publication Data
US 2017/0151537 A1  Jun. 1, 2017

(30) Foreign Application Priority Data
Jun. 20, 2014 (EP) .................................... 14173333

(51) Int. Cl.
*B01F 5/02* (2006.01)
*B01F 13/00* (2006.01)
(Continued)

(52) U.S. Cl.
CPC ........ *B01F 13/0062* (2013.01); *B01F 3/0807* (2013.01); *B01F 5/0206* (2013.01);
(Continued)

(58) Field of Classification Search
CPC .................................................... B01F 5/0206
(Continued)

(56) References Cited

U.S. PATENT DOCUMENTS 2,815,532 A * 12/1957 Braunlich ............. B01F 5/0609
137/896
3,905,395 A *  9/1975 Hupe ....................... B01F 5/04
366/181.8

(Continued)

FOREIGN PATENT DOCUMENTS

EP   1473077 A2   11/2004
FR   2976824 A1   12/2012

OTHER PUBLICATIONS

Extended European Search Report for corresponding European Application No. 14173333.7, dated Dec. 3, 2014.
International Search Report for corresponding International PCT Application PCT/EP2015/064005, dated Sep. 15, 2015.

Primary Examiner — David L Sorkin
(74) Attorney, Agent, or Firm — Workman Nydegger

(57) ABSTRACT

A micro-reactor system for contacting fluids is described. The system comprises a first microfluidic channel structure for guiding a first fluid to at least one output nozzle thus generating a first sub-flow, a second microfluidic channel structure for guiding a second fluid to at least a second output nozzle thus generating a second sub-flow, said first output nozzle being aligned with said second output nozzle and arranged for contacting the first sub-flow and the second sub-flow. The micro-reactor comprises at least a third microfluidic channel structure for at least a third, inert, fluid generating at least a third sub-flow arranged to be positioned adjacent at least the first and/or the second sub-flows so as to act as a wall between said first and/or second sub-flows.

10 Claims, 2 Drawing Sheets

(51) Int. Cl.
  *B01J 19/00* (2006.01)
  *B01F 3/08* (2006.01)
  *B01F 15/00* (2006.01)

(52) U.S. Cl.
  CPC ........ *B01F 5/0256* (2013.01); *B01F 13/0066* (2013.01); *B01F 15/00123* (2013.01); *B01J 19/0093* (2013.01); *B01F 2215/0032* (2013.01); *B01F 2215/0036* (2013.01); *B01J 2219/0095* (2013.01); *B01J 2219/00788* (2013.01); *B01J 2219/00889* (2013.01)

(58) Field of Classification Search
  USPC .............................. 366/162.4, 173.2, 181.6
  See application file for complete search history.

(56) References Cited

U.S. PATENT DOCUMENTS

| | | | | |
|---|---|---|---|---|
| 7,147,364 B2* | 12/2006 | Oohashi | ................ | B01F 5/0256 366/162.4 |
| 7,829,039 B2* | 11/2010 | Schubert | ............. | B01F 13/0059 366/134 |
| 2002/0057627 A1* | 5/2002 | Schubert | ............... | B01F 5/0644 366/336 |
| 2003/0039169 A1* | 2/2003 | Ehrfeld | ................ | B01F 5/0604 366/336 |
| 2005/0007872 A1* | 1/2005 | Nagasawa | ............ | B01F 5/0453 366/178.2 |
| 2005/0068845 A1* | 3/2005 | Oohashi | ................ | B01F 5/0256 366/177.1 |
| 2009/0097352 A1* | 4/2009 | Sawada | ................ | B01F 3/0861 366/158.5 |

* cited by examiner

MIXING OF FLUIDS

FIELD OF THE INVENTION

The invention relates to the field of methods and systems for contacting fluids. More specifically it relates to microfluidic channel based micro-reactors for contacting of miscible or immiscible fluid flows at high throughput and/or uniformly.

BACKGROUND OF THE INVENTION

An application of interest has been the generation of monodisperse emulsions at very large throughputs. The generation of uniform droplet sizes is of great interest for all operations wherein droplets are required, such as for (reactive) liquid-liquid extraction. The large degree of uniformity of the droplets (or of the crystals that are generated) gives superior optical or organoleptic properties. Furthermore it is of interest when control on local chemical environments is relevant (especially relevant in Pharmacy).

Monodisperse emulsions can in principle be obtained by contacting immiscible flows with each other in a controlled fashion. Micro reactors having proper characteristics may provide a suitable solution for the generation of monodisperse emulsions, although the throughput may be low. One approach is to make monodisperse emulsions based on etched reactors. In such etched reactors, a micro-fluidic channel structure can be made through etching of a surface, resulting in the generation of a number of nozzles in the device, which allow for monodisperse emulsions. Whereas the drop size distributions of etched 2D arrays of nozzles can be obtained with a variance as low as 2%, the maximum number of nozzles that can be provided is limited, resulting in a significant limitation of the throughput.

Another application of interest is the contacting of miscible flows in a uniform way, for example for making very uniform crystals. The use of micro reactors for these purposes has been considered but often clogging and fouling occurs. The latter may for example be caused by the fact that the individual flows or the resulting formed product are interacting with the material of the micro reactor, for example with small dimensioned nozzles or channels.

SUMMARY OF THE INVENTION

It is an object of embodiments of the present invention to provide good systems and methods for contacting fluids.

It is an advantage of at least some embodiments of the present invention that a high throughput system is obtained, whereby a sharp residence time distribution can be obtained.

It is an advantage of at least some embodiments of the present invention that effective intermixing can be obtained, resulting in a decreased reaction time.

It is an advantage of at least some embodiments of the present invention that accelerated phase splitting can be obtained after extraction by improved control of the drop size distribution in the micro reactor system.

It is an advantage of at least some embodiments of the present invention that gelling or precipitation can be avoided. It is an advantage of at least some embodiments of the present invention that fast and controlled mixing of the initial products can be obtained without blocking of the micro reactor.

It is an advantage of at least some embodiments of the present invention that a controlled residence time is obtained resulting in a finer particle size distribution.

It is an advantage of at least some embodiments of the present invention that an improved performance can be obtained for specific hydrometallurgical processes such as solvent extraction or precipitation extraction.

It is an advantage of at least some embodiments of the present invention that the residence time of the mixed fluids can be substantially the same for the different output nozzles. It is an advantage of embodiments according to the present invention that substantially equal flow rate can be obtained for the different output nozzles.

It is an advantage of at least some embodiments of the present invention that an improved phase separation can be obtained after extraction, as a good control of drop size distribution can be obtained with the reactor.

It is an advantage of at least some embodiments of the present invention that gelling or precipitation can be avoided as accurate mixture of the fluids can be obtained. It is an advantage of embodiments of the present invention that a short and homogeneous residence time can be obtained.

The above objective is accomplished by a method and device according to the present invention.

The present invention relates to a micro-reactor system for contacting fluids, the system comprising a first microfluidic channel structure for guiding a first fluid to at least one output nozzle thus generating a first sub-flow, a second microfluidic channel structure for guiding a second fluid to at least a second output nozzle thus generating a second sub-flow, said first output nozzle being aligned with said second output nozzle and arranged for contacting the first sub-flow and the second sub-flow, and the micro-reactor comprising at least a third microfluidic channel structure for at least a third, inert, fluid generating at least a third sub-flow arranged to be positioned adjacent at least the first and/or the second sub-flows so as to act as a wall between said first and/or second sub-flows.

The first microfluidic channel structure may be adapted for distributing the first fluid to a set of output nozzles thus generating a first set of sub-flows, the second microfluidic channel structure may be adapted for distributing the second fluid to at least a set of output nozzles thus generating a second set of sub-flows, said first set of output nozzles being aligned with said second set of output nozzles and arranged for contacting the first set of sub-flows and the second set of sub-flows, and the third microfluidic channel structure may be adapted for distributing the third, inert, fluid generating a set of third sub-flows arranged to be positioned adjacent the first and/or second set of sub-flows so as to act as a wall between the first and/or second set of sub-flows.

It is an advantage of embodiments according to the present invention that interaction between two fluids can be accurately controlled and that before interaction between the fluids take place, the interaction of the fluids with the actual walls of the multi-jet reactor system can be reduced or avoided. It is an advantage of embodiments according to the present invention that the sets of sub-flows can be provided at low flow speed, resulting in a continuous movement—and thus not blocking—near the side formed by the sub-flow.

The third microfluidic channel system furthermore may be provided with predesigned nozzles configured for generating one or more sub-flows at different sides of the first and second sub-flow(s) as well in between the first and the second sub-flow(s).

The third microfluidic channel system and optional further microfluidic channel systems may be configured for generating at least a number of further sub-flows or sets of sub-flows arranged to flow at different sides and in between the first sub-flow and second sub-flow or at different sides and in between the first set of sub-flows and second set of sub-flows.

The third microfluidic channel system may be adapted in channel dimension to bend the first and/or the second sub-flow or set of sub-flows.

The third microfluidic channel system may be arranged for separating the first and second sub-flow or the first and second set of sub-flows over a predetermined length.

The system may comprise a controller for controlling the third sub-flow or sub-flows for controlling said contacting of the first sub-flow(s) and the second sub-flow(s).

In one aspect, the present invention relates to a micro-reactor system for contacting fluids, the system comprising
a first substrate and a second substrate,
at least a first microfluidic channel structure positioned in the first substrate for distributing a first fluid into a plurality of first sub-flows distributed to a first set of output nozzles for outputting the first fluid and a second microfluidic channel structure positioned in the second substrate for distributing a second fluid into a plurality of second sub-flows distributed to a second set of output nozzles for outputting the second fluid, the first substrate furthermore comprising through holes from a first surface of the first substrate to the surface where the first set off output nozzles is present and the first substrate and the second substrate being aligned such that the second set of output nozzles of the second microfluidic channel system are in fluidic contact with said through holes, and said first set of output nozzles being aligned with said second set of output nozzles and arranged for contacting the first fluid and the second fluid. It is an advantage of embodiments of the present invention that manufacturing of the micro-reactor system can be performed in an efficient and accurate way by manufacturing different microfluidic channel structures in different substrates and having the possibility for accurately aligning these substrates with respect to each other thus forming an overall system.

The first set of output nozzles may be in fluid contact with the second set of output nozzles via microfluidic channels extending in a thickness direction of the first and the second substrate.

The first microfluidic channel system and/or the second microfluidic channel system may be made using any of 3D printing, etching, moulding or alike.

The output nozzles may be arranged in substantially two different directions.

The first and the second fluid may be substantially different.

The micro-reactor may be an emulsifying micro-reactor, and wherein drops of first fluid are formed in the different second sub-flows of second fluid.

The first set of output nozzles may be arranged with respect to said second set of output nozzles so as to deliver the different first sub-flows in the center of the second set of output nozzles and thus form drops, liquid plugs or alike of the first fluid in the different second sub-flows of second fluid.

The micro-reactor may be a mixing system, and the substrate may be adapted for outputting a mixture of at least the first and the second fluid.

The micro-reactor furthermore may comprise at least a third microfluidic channel system for at least a third inert fluid generating at least a third set of sub-flows arranged to be positioned adjacent at least the first and/or the second sub-flows so as to act as a wall for said first and/or second sub-flows.

The third microfluidic channel system may be arranged for generating at least a third set of sub-flows of inert fluid arranged to flow in between the first sub-flows and the second sub-flows in order to separate these sub-flows over a predetermined length.

The third microfluidic channel system furthermore may be provided with predesigned nozzles configured for generating sub-flows at different sides of the first and second sub-flows as well in between the first and the second sub-flow.

The third microfluidic channel system and further microfluidic channel systems may be configured for generating at least a number of further sets of sub-flows arranged to flow at different sides and in between the first sub-flows.

The third microfluidic channel system may be adapted in channel dimension to bend the first and/or the second set of sub-flows.

In one aspect, the present invention relates to a micro-reactor system for contacting fluids, the system comprising a substrate, at least a first microfluidic channel structure for distributing a first fluid into a plurality of first sub-flows distributed to a first set of output nozzles for outputting the first fluid and a second microfluidic channel structure for distributing a second fluid into a plurality of second sub-flows distributed to a second set of output nozzles for outputting the second fluid, said first microfluidic channel structure and said second microfluidic channel structure being substantially positioned in different planes of the substrate and said first set of output nozzles being aligned with said second set of output nozzles and arranged for contacting the first fluid and the second fluid.

It is an advantage of embodiments of the present invention that by separating the first microfluidic channel system and the second microfluidic channel system in separate planes, the density of output nozzles for outputting the contacted fluids, e.g. an emulsion or a mixture of fluids, can be high. It is an advantage of embodiments according to the present invention that efficient contacting between a first and a second fluid at a large number of nozzles can be obtained.

The substrate may have a thickness in a thickness direction, and wherein the first set of output nozzles are in fluid contact with the second set of output nozzles via microfluidic channels extending in the thickness direction between the different planes.

The substrate may comprise an output surface substantially parallel with said different planes, wherein the second set of output nozzles are output nozzles positioned in the output surface for outputting the contacted fluids or are fluidically connected to a set of output nozzles positioned in the output surface for outputting the contacted fluids.

It is an advantage of embodiments of the present invention that a high density of output nozzles can be obtained.

The substrate may comprise at least a first sub-substrate comprising the first microfluidic channel system and a set of through holes extending from the first set of output nozzles of the first microfluidic channel towards a surface of the first sub-substrate and a second sub-substrate comprising the second microfluidic channel system, the second sub-substrate being in contact with said surface of the first sub-substrate and being aligned such that the second set of output nozzles of the second microfluidic channel system are in fluidic contact with said through holes.

Alternatively, the micro-reactor may comprise a substrate whereby the microfluidic channel systems are implemented in the same substrate, but respectively at a top and bottom side thereof.

the first microfluidic channel system and/or the second microfluidic channel system may be made using any of 3D printing, etching, moulding or alike.

The output nozzles may be arranged in substantially two different directions.

The first and the second fluid may be substantially different.

The micro-reactor may be an emulsifying micro-reactor, and the drops or liquid plugs of first fluid may be formed in the different second sub-flows of second fluid.

It is an advantage of embodiments of the present invention that uniform drops can be obtained. When identical reaction drops are used, identical kinetics can be obtained, e.g. for extraction.

The first set of output nozzles may be arranged with respect to said second set of output nozzles so as to deliver the different first sub-flows in the center of the second set of output nozzles and thus form drops, liquid plugs or alike of the first fluid in the different second sub-flows of second fluid.

The micro-reactor may be a mixing system, and wherein the substrate is adapted for outputting a mixture of at least the first and the second fluid.

It is an advantage of embodiments of the present invention that efficient mixing can be obtained.

The micro-reactor furthermore may comprise at least a third microfluidic channel system for at least a third inert fluid generating at least a third set of sub-flows arranged to be positioned adjacent at least the first and/or the second sub-flows so as to act as a wall for said first and/or second sub-flows.

It is an advantage of embodiments according to the present invention that interaction with the wall of a micro-reactor can be avoided by replacing the wall by a flow of fluid. The latter may result in a reduced risk of blocking or fouling of the reactor.

The third microfluidic channel system may be arranged for generating at least a third set of sub-flows of inert fluid arranged to flow in between the first sub-flows and the second sub-flows in order to separate these sub-flows over a predetermined length.

It is an advantage of embodiments according to the present invention that interaction between two fluids can be accurately controlled and that before interaction between the fluids take place, the interaction of the fluids with the actual walls of the multi-jet reactor system can be reduced or avoided. It is an advantage of embodiments according to the present invention that the sets of sub-flows can be provided at low flow speed, resulting in a continuous movement—and thus not blocking—near the side formed by the sub-flow.

The third microfluidic channel system furthermore may be provided with predesigned nozzles configured for generating sub-flows at different sides of the first and second sub-flows as well in between the first and the second sub-flow.

The third microfluidic channel system and further microfluidic channel systems may be configured for generating at least a number of further sets of sub-flows arranged to flow at different sides and in between the first sub-flows.

The third microfluidic channel system may be adapted in channel dimension to bend the first and/or the second set of sub-flows.

It is an advantage of embodiments according to the present invention that a shortened contacting time is required compared to the contacting time required when mixing is to be performed by diffusion between parallel fluid streams. It is an advantage of embodiments of the present invention that parallel flow under an angle can be obtained and thus faster contact can be obtained.

The present invention also relates to a jet mixer for performing precipitation reactions, the jet mixer comprising a micro-reactor as described above.

The present invention also relates to an emulsifying system for performing emulsion actions, the emulsifying system comprising a micro-reactor as described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1A:
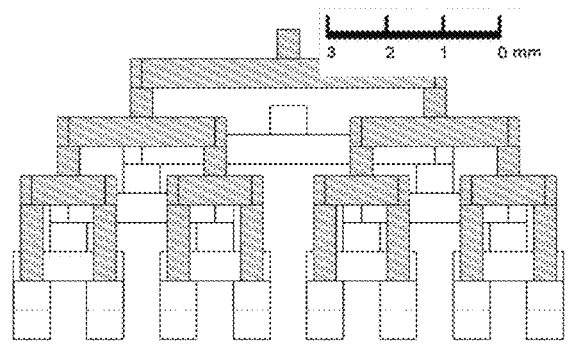
FIGS. 1a-1b: a) 3D stacked flow distributor with 64 outlets for droplet generation. b) droplets generated with the reactor at identical flow rate, according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a micro-reactor system for contacting fluids. The micro-reactor system according to embodiments of the present invention comprises a substrate and at least a first microfluidic channel structure for distributing a first fluid into a plurality of first sub-flows distributed to a first set of output nozzles for outputting the first fluid. The system also comprises a second microfluidic channel structure for distributing a second fluid into a plurality of second sub-flows distributed to a second set of output nozzles for outputting the second fluid. According to embodiments of the present invention, the first microfluidic channel structure and said second microfluidic channel structure are substantially positioned in different planes of the substrate. The first set of output nozzles furthermore are aligned with said second set of output nozzles and are arranged for contacting the first fluid and the second fluid.

With this approach it is possible that very small nozzle dimensions can be conceived in large quantities. According to at least some embodiments of the present invention, a particular way of connecting zones with different liquids in a practical fashion in large arrays is provided by providing flows perpendicular to the substrate surface. In this way a density can be reached with is substantially higher than the solutions provided up to now. It furthermore is an advantage of embodiments of the present invention that contact of different flows after their generation through the output nozzles can be avoided.

It is an advantage of embodiments of the present invention that the density of the nozzles can be increased with respect to densities obtained with conventional systems, as the output nozzles can be arranged not only in one direction, but also in a second direction different from the first direction. It thereby is advantageous that a substantially equal pressure distribution can be obtained for the different nozzles. The latter may for example also assist in the fact that the flows stemming from the different nozzles stay separated, after they have left the final output nozzles.

It is an advantage that a drop size variation of less than 10%, advantageously less than 5% can be obtained in systems according to embodiments of the present invention while the power consumption can be more than 5% lower, advantageously more than 10% lower, more advantageous more than 20% lower, even more advantageous more than 50% lower compared to conventional systems.

By way of illustration, embodiments of the present invention not being limited thereto, some examples will further be described, illustrating standard and/or optional features of some embodiments of the present invention.

In the example, a particular microfluidics based microreactor was obtained, wherein different channels are defined in different planes of the system. The latter was obtained by providing microfluidics channels in each of two or more substrates whereby the substrates are aligned to each other such that the fluids flowing through the microfluidics channels can be merged. Such reactors can be made in any suitable way, for example by molding of the microfluidic channels, by laser ablation, by etching, by additive manufacturing, etc.

Advantageously, the different substrates used for defining the different microfluidic channel structures may be flat substrates such that the substrates can be easily shifted with respect to each other for aligning the substrates. By using separate substrates, easy manufacturing can be obtained as the microfluidic channel structures can be manufactured independent of each other. The feed line for delivering fluids to each of the different microfluidic channel structures may be performed substantially from a side. The feed line for a microfluidic channel structure may for example be positioned within the respective substrate wherein the microfluidic channel structure is positioned. The feed line may thus be oriented parallel with the substrate and in the substrate. In some embodiments the feed line may be positioned perpendicular to the substrate. The feed line may be positioned at a side of the microfluidic channel structure, i.e. outside the projection area of the microfluidic channel structure.

Experiments showed that really narrow variances could be obtained (down to 1.3%) based on microfluidics based systems whereby the channel systems were defined in the same plane of the substrate. According to embodiments of the present invention, this can be implemented in different planes in the substrate(s). By aligning the cross junctions where the two phases are contacted, high throughput can be obtained.

Figure 1B:
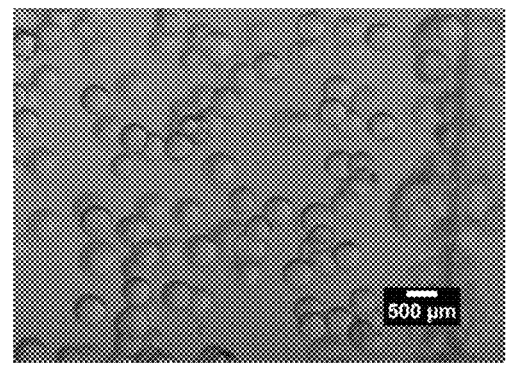

The unique fluidic design in the present example thus is based on generation of microfluidic channel systems in thin plates, e.g. substrates also referred to as sub-substrates, that can be machined with precision fabrication technology and structured such in a reactor that an extremely large numbers of nozzles can be generated at a reactor wall, with a large degree of precision. In order to make emulsions with droplets on the order of micrometers, the nozzle dimensions were on the order of micrometers. By sandwiching patterned plates, e.g. substrates also referred to as sub-substrates, these small dimensioned and accurately machined nozzles can be conceived in large numbers. Crucial in generating uniform droplets is also the obtained flow distribution, which can be properly controlled with the precision that can be achieved in the proposed scheme, as shown in FIG. 1 (a).

Figure 2:
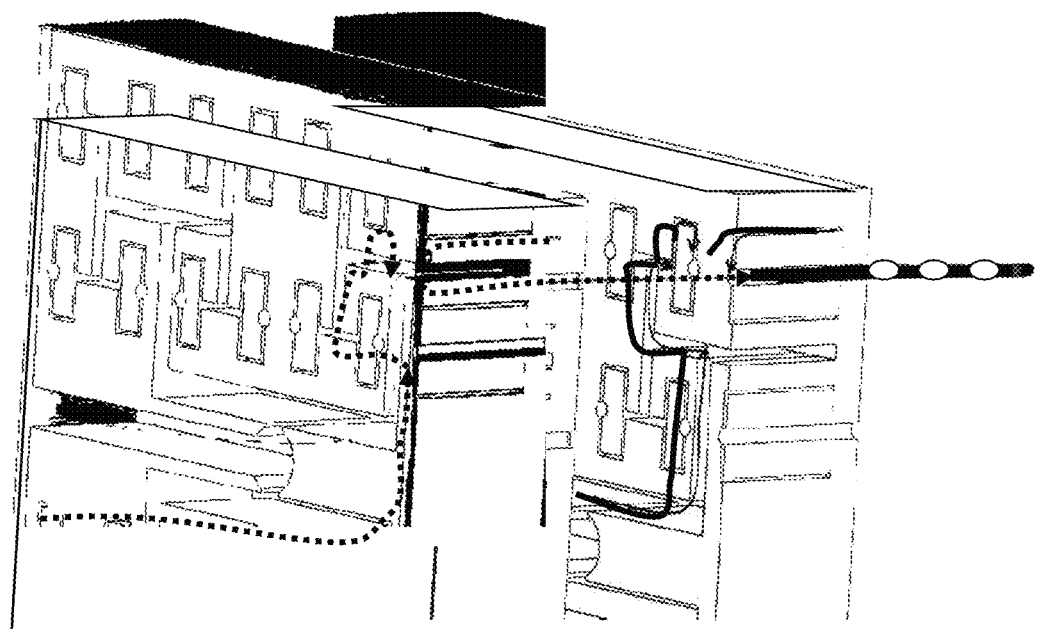
FIG. 2: illustrates a close-up of a reactor design for emulsifying, according to an embodiment of the present invention.

In FIG. 2, the principle is shown wherein the two substrates are combined. In a first substrate, the first microfluidic channel system is provided for distribution of a first fluid. As can be seen, the first microfluidic channel system furthermore indeed comprises a plurality of throughputs, connected to the first channel system. These throughput holes allow the first fluid to flow from one side of the substrate to the other side of the substrate where they can be contacted with the second fluid. The second fluid is generated in a second microfluidic channel system, provided for distribution of a second fluid. The dispersed phase flows (the flow coming from the left plate) are distributed by the microfluidic channel structure into broader channels where, due to high shear forces of the continuous phase, droplets are formed.

The emulsifier of the present example was build using PMMA (supplied by Eriks-baudoin) 1 mm casted sheets processed on the in-house micro milling machine (Datron m7). This process, combined with thermal annealing allowed for channels dimensions down to 100 µm channels for the final channels. The several layers of the reactor were thermally annealed at 150° C. for 15 min/layer. The novel micro reactor design was studied to produce emulsions with a low droplet size distribution (DSD). Experiments were performed using hexane and water with either sodium dodecyl sulphate (SDS—Sigma Aldrich) or sorbitan monooleate (span 80—Sigma Aldrich) to either make an oil in water (O/W) or water in oil (W/O) emulsion with a high weight fraction (>30 wt %) dispersed phase. Experiments were conducted using pressurized vessels to assure a stable flow output run between 1 and 10 bar at flow rates of 1-20 ml/min produced droplets with a d32 <300 um and a DSD below 10%.

Another advantage of embodiments of the present invention is that more uniform particles can be generated. Furthermore, the design allows to avoid clogging of the formed particles.

Figure 3:
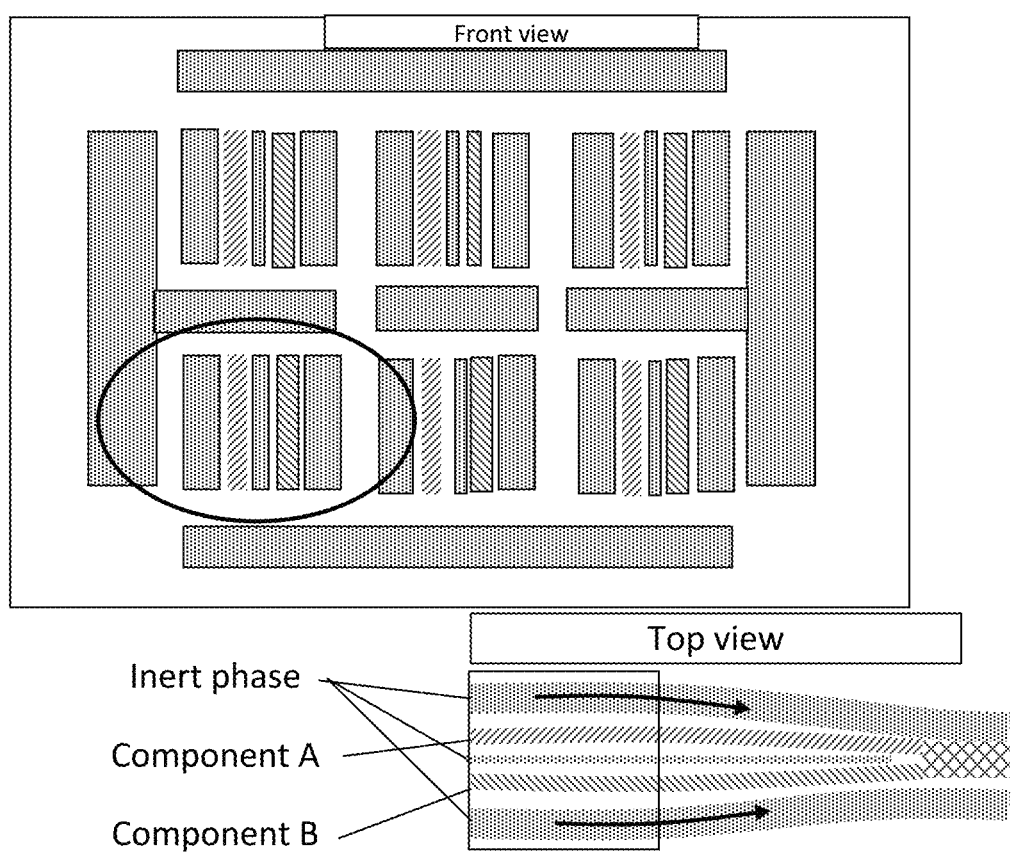
FIG. 3: illustrates a micro reactor according to an embodiment of the present invention wherein inert flows are used to avoid contact of the reagents with the reactor or to control the contact point for reagents.

In another example, the application of contacting can be conceived in large quantities. In the example, the T-mixer concept was combined with a bifurcating flow distributor. In the example two bifurcating flow distributors with different dimensions were combined assuring specific uniform velocities at the outlets. When 2 streams that are contacted give rise to a precipitation, a uniform flow distribution as presented here is beneficial to generate uniform particles. Handling of solid materials in microreactors is however extremely challenging and clogging generally takes place when confined zones are contacted with particles. With the presented approach, inert stream(s) that (is) are implemented in the design can delay such contact. The principle is shown in FIG. 3, wherein inert phases are provided around and in between the components A and B. By controlling the speed of the flows, the components can be directed to each other for contacting them, without contact with the reactor walls.

It is an advantage of embodiments of the present invention that a too early contacting between components as well as contacting of the components with the reactor wall can be reduced or even avoided. In a particular example, 5 flows are generated, i.e. a flow for each of the components and three flows for the inert material. By controlling the dimensions of the channels for the inert material, it is possible to obtain a controlled deviation of the direction of flow for the components. The latter allows to obtain optimal contacting.

Embodiments of the present invention also improve the flexibility for cleaning the reactor pipes/flows. In order to avoid aggregation at the level of the reactor walls, flows of inert material at low speed can be used to guarantee continuous movement against the reactor walls.

According to some embodiments, an inert flow may be used for first separating components to be mixed. The inert flow is then injected in between the components to be mixed, resulting in a separation of the reaction entities and thus in a delay of mixing of the reaction entities. The reaction entities have a uniform residence time and furthermore have internal mixing resulting in a homogeneous distribution of elements in the reaction entity. It is to be noticed that the principle of delayed contacting using an inert fluid as separation wall can also be obtained in a microfluidic device wherein the different microfluidic channel structures are not positioned in different layers or different substrates. Nevertheless, embodiments also encompass systems wherein the delayed contacting is combined with the provision of microfluidic channel structures provided in separate layers or different substrates.

It is an advantage of embodiments of the present invention that solvent extraction can be performed at high temperatures and consequently also at high pressure. This results in improved kinetics of the process, resulting in shortened residence time. On the other hand, also an optimal drop size distribution is obtained, combining a high contact surface between the flows and having a good phase separation after extraction. The latter can be obtained by having a narrow drop size distribution.

It is an advantage of embodiments of the present invention that due to the large choice of freedom for designing the channel dimensions, large shear forces can be introduced. The latter may allow obtaining the narrow drop size distributions. The dimensions of the drop formation zone typically may be in the range of a few micrometer, e.g. between 30 and 150 µm, depending on the substrate used, the wanted drop size and the combination continuous/discontinuous phase used. The latter results in the fact that per volume of the reactor, a high flow of emulsion drops can be obtained with a minimal drop size distribution.

It is an advantage of embodiments of the present invention that not only uniform residence times are obtained, but also that identical flows are obtained at each nozzle. The local flow resistance in the different channels can be optimized or controlled by controlling the dimensions of the channels of the microfluidic channel structures used.

A specific example involves the production of drug loaded poly(lactic-co-glycolic) acid (PLGA) microparticles which are of interest in the context of e.g. cell therapy. The internalisation efficiency of the particles into a cell is dependent on the particles size, imposing the need for a small size distribution of the particles (PSD). The obvious dependence of drug release on particle size is a second driver for achieving small PSD's. The PLGA particles are produced in an emulsion crystallization process, which occurs very fast after contacting an organic (e.g. dichloromethane) phase containing the drug and PLGA with an aqueous phase (containing an anti-solvent such as poly-vinyl-alcohol). When the droplets are generated by stirring in a tank, the large DSD in not ideal for the above mentioned reasons. When the droplets would be performed in a micro-fluidics environment wherein strategies are known to improve the DSD, instantaneous clogging of the device would take place due to the fast kinetics of the solidification process. Extended contact (away for channel walls and confined spaces such as mixing areas or nozzles) is therefore vital to ensure a continuous and robust functioning the device. For this an inert liquid (water) stream, flowing between the nozzle phase and the continuous phase, can be used to extent the contact 10-1000 μm from the channel walls. A shorter distance will imply a more efficiently operated reactor, which ideally requires an angled flow directed, so that the liquid contact is accelerated as compared to a parallel flow situation. The extent of this angled situation is controlled by the ratio of the flow rate of the inert phase to that of the other phases.

To produce particles of 1 μm nozzles of a similar size containing the discontinuous phase are typically required, with the exact dimensions depending on the flow rates, composition of the phases and the substrate material (say between 0.5 and 30 μm). For the production of larger particles, nozzles of up a few 100 μm can be relevant.

In a further aspect, the present invention also relates to a method of manufacturing a system as described above. Such a method may comprise creating at least a first microfluidic channel system and a second microfluidic channel system as described in one or more substrates, whereby the microfluidic channel systems are not positioned in the same plane. Such manufacturing may be with any suitable manufacturing technique, such as additive manufacturing, laser ablation, etching, . . . etc. The channel systems can be closed by providing an additional layer on top thereof. The channel systems can be manufactured in different surfaces of the same substrate or can be manufactured in different substrates which are then merged using conventional techniques. During manufacturing furthermore alignment of the channel systems is provided and throughputs through the substrates are provided allowing to contact different flows generated in the different channel systems with each other.

In another aspect, the present invention also relates to the use of a system as described above for contacting miscible or immiscible fluids.

The invention claimed is:

1. A micro-reactor system for contacting fluids, the system comprising
a first substrate and a second substrate,
at least a first microfluidic channel structure positioned in the first substrate and comprising a first set of output nozzles, the at least first microfluidic channel structure configured to distribute a first fluid into a plurality of first sub-flows distributed to the first set of output nozzles for outputting the first fluid, and
a second microfluidic channel structure positioned in the second substrate and comprising a second set of output nozzles the second microfluidic channel structure configured to distribute a second fluid into a plurality of second sub-flows distributed to a second set of output nozzles for outputting the second fluid,
the first substrate furthermore comprising through holes from a first surface of the first substrate to a surface where the first set of output nozzles are present and the first substrate and the second substrate being aligned such that the second set of output nozzles of the second microfluidic channel structure are in fluidic contact with said through holes, and said first set of output nozzles being coaxial with said second set of output nozzles and configured to contact the first fluid and the second fluid;
wherein the micro-reactor system is an emulsifying micro-reactor configured to form drops or liquid plugs of the first fluid in the plurality of second sub-flows of the second fluid;
the first set of output nozzles extending with respect to the second set of output nozzles such that the first and second plurality of sub-flows flow in a same direction through a thickness direction of the first and second substrates;
wherein the plurality of first sub-flows contacts or delivers in a center of the second plurality of sub-flows such that droplets are formed.

2. A micro-reactor system according to claim 1, wherein the first set of output nozzles are in fluid contact with the second set of output nozzles via microfluidic channels extending in a thickness direction of the first and the second substrate.

3. A micro-reactor system according to claim 1, wherein the first microfluidic channel structure and/or the second microfluidic channel structure is made using any of 3D printing, etching, or moulding.

4. A micro-reactor system according to claim 1, wherein the first and second sets of output nozzles are arranged in substantially two different directions.

5. A micro-reactor system according to claim 1, wherein the first and the second fluid are substantially different.

6. A micro-reactor system according to claim 1, wherein the micro-reactor is a mixing system, and wherein the substrate is configured to output a mixture of at least the first and the second fluid.

7. A micro-reactor system according to claim 1, wherein the micro-reactor furthermore comprises at least a third microfluidic channel system for at least a third inert fluid generating at least a third set of sub-flows arranged to be positioned adjacent at least the first and/or the second sub-flows so as to act as a wall for said first and/or second sub-flows.

8. A micro-reactor system according to claim 7, wherein the third microfluidic channel system is configured to generate at least a third set of sub-flows of inert fluid arranged to flow in between the first sub-flows and the second sub-flows in order to separate these sub-flows over a predetermined length and/or wherein the third microfluidic channel system furthermore is provided with predesigned nozzles configured for generating sub-flows at different sides of the first and second sub-flows as well in between the first and the second sub-flow.

9. A micro-reactor system according to claim 7, wherein the third microfluidic channel system and further microfluidic channel systems are configured to generate at least a number of further sets of sub-flows arranged to flow at different sides and in between the first sub-flows.

10. A micro-reactor system according to claim 7, wherein the third microfluidic channel system is adapted in channel dimension to bend the first and/or the second set of sub-flows.

* * * * *

UNITED STATES PATENT AND TRADEMARK OFFICE
CERTIFICATE OF CORRECTION

PATENT NO. : 10,807,054 B2
APPLICATION NO. : 15/319824
DATED : October 20, 2020
INVENTOR(S) : De Malsche et al.

It is certified that error appears in the above-identified patent and that said Letters Patent is hereby corrected as shown below:

On the Title Page

Item (73), Assignee, change "VRUE UNIVERSITEIT BRUSSEL" to –VRIJE UNIVERSITEIT BRUSSEL–

Signed and Sealed this
Eighth Day of December, 2020

Andrei Iancu
*Director of the United States Patent and Trademark Office*